United States Patent Office — 3,759,685, Patented Sept. 18, 1973

3,759,685
APPARATUS FOR CLADDING POLYGONAL CROSS-SECTION LASER RODS
Amadee D. Marino and Clifford W. Ask, Sr., Woodstock, Mass., assignors to American Optical Corporation, Southbridge, Mass.
Original application Feb. 16, 1971, Ser. No. 115,495. Divided and this application Sept. 15, 1972, Ser. No. 289,493
Int. Cl. C03b 23/20
U.S. Cl. 65—156                5 Claims

ABSTRACT OF THE DISCLOSURE

A side of a polygonal cross-sectioned glass laser rod core may be clad by applying a slab of a suitable cladding glass material thereto. The fusing of the slab to the core without the formation of entrapped gas bubbles therebetween is accomplished by allowing the slab to rest in essentially line contact with the side of the core at the end adjacent a suitable drawing furnace. The other end of the slab is spaced away from the core material. Means is provided for urging the slab of cladding material toward the side of the core such that as the core and cladding material are drawn within the drawing furnace, the line of contact between the core and cladding gradually traverses the length of the core and cladding thereby forcing any gas out of the space which exists between the core and cladding to provide a bubble-free interface in the resulting clad glass laser rod.

CROSS-REFERENCES TO RELATED APPLICATIONS

This is a division of application Ser. No. 115,495 filed Feb. 16, 1971, now U.S. Pat. No. 3,721,537.

BACKGROUND OF THE INVENTION

This invention is related to glass laser structures and is more particularly concerned with a novel method and apparatus for cladding one or more sides of a glass laser rod core which has a polygonal cross-section.

It has become standard practice in recent years to surround a generally circular glass laser rod with a cladding of a compatible glass material. This cladding has been provided for a variety of reasons. It is often desirable to filter out certain spectral components from the pumping light energy input to the active laser rod core. An example of such a need is the problem of the solarization of various glass materials. The solarization, or coloring of the glass, is caused by irradiation of the glass materials with an ultraviolet light source. Many standard pumping light sources emit appreciable amounts of such ultraviolet light; therefore, the cladding materials sometimes contain an absorber of ultraviolet light, such as cerium. This is particularly true in those instances where such an absorber cannot be directly incorporated into the core glass.

In a slightly different known form of laser construction, a transparent cladding material of a lower predetermined refractive index than that of the laser core is used. This cladding material provides the effect of optically immersing the active laser core within the cladding material and thereby obtaining an increase in the amount of pumping light energy which can be directed onto the laser core through the focusing function of the cladding material.

Another, and perhaps most important, function of cladding materials surrounding a glass laser rod core is the inclusion within the laser rod cladding of materials which are absorbant of the laser emission wavelengths and which are transparent at the pumping wavelengths. Such cladding materials are useful because off-axis emission modes within the core pass freely into the cladding and are absorbed therein. Therefore, the output from such a laser rod is substantially free of any off-axis emission modes. Such a material for the cladding of a neodymium doped glass laser is set forth in U.S. Pat. No. 3,445,785, issued May 20, 1969, to Koester et al.

Until recently, the vast majority of laser rod configurations have been circular; however, a small number have had an elliptical cross-section. Numerous highly efficient processes and machines have been developed for cladding such cylindrical configurations. The majority of these techniques have been borrowed directly from the fiber optic art. An example of a well-known method and machine for cladding glass laser rod cores is shown in U.S. Pat. No. 3,037,241, issued June 5, 1962, to Bazinet and Cole. In this method, a cylindrical glass laser rod core is fitted within a tube of cladding glass material. An end is sealed and a vacuum is drawn within the annular space between the core and cladding material. As the core and cladding are lowered into a drawing furnace, the sealed end first, the glass of the cladding material softens prior to fusion and the one atmosphere of force exerted on the cladding as a result of the vacuum, collapses the cladding tube against the core material thereby forming an interface which is free of gas bubbles between the core and the cladding.

Recently, however, laser rods of other than circular or elliptical cross-sectional configurations have come to the fore. An excellent example of such a laser rod is set forth in U.S. patent application Ser. No. 817,909, filed Apr. 21, 1969, by Joseph P. Segre, and assigned to the same assignee as the present application. This application discloses a "slab laser." The slab laser rod is an elongated rod having a rectangular cross-section of at least a 2:1 aspect ratio of width to thickness. In many applications, for the above recited reasons, it has become necessary to clad such a laser rod. The aforementioned technique of collapsing a tubing around such a laser rod has been attempted and has proven highly unsuccessful. This is due to the vast difference in configuration which causes both build-up and thinning of the cladding at various points around the circumference. Furthermore, it is extremely difficult to prevent the entrapment of bubbles of gas at the interface between the tube and the cladding.

In working with the development effort surrounding the slab laser rod, it has been determined that in various applications, it is necessary only that certain surfaces of the core be clad in order that efficient operation may be had.

Therefore, additional methods have been attempted for the cladding of such rectangularly cross-sectioned laser rods. One such method which was again borrowed from the fiber optic art is shown in U.S. Pat. No. 2,992,517, issued July 18, 1961, to Hicks. In this technique, a clad laser rod is drawn directly from molten constituents through two concentric orifices. A second method shown therein teaches the formation of a clad glass laser rod by flowing a molten cladding around a solid core glass. In a later step in each case, the clad rod is formed into a desired cross-sectional configuration by shaping the still soft rod with rollers. This technique has proven to be far too complex for the formation of large laser rods as the fiber optic devices which were formed as shown in the patent were of extremely small cross-sectional configurations.

Finally, it has been proposed and attempted to place and clamp slabs of the desired cladding glass material directly against the sides of the laser rod core. Thereafter, the core and slabs of cladding material have been drawn in a standard drawing furnace to a smaller size thereby fusing the core and cladding materials together. This has proven to be unsatisfactory as a method of producing practical laser devices. The clamping of the core and cladding together has caused the entrapment of considerable amounts of gas between the core and cladding which form bubbles at the interface which in turn can cause deterimental performance and possible catastrophic failure of the laser rod.

SUMMARY OF THE INVENTION

Accordingly, it is an object of the present invention to provide a novel method and apparatus for cladding glass laser rods having polygonal cross-sectional configurations.

Another object is to provide such method and apparatus to form clad, polygonal cross-sectioned glass laser rods which are free of entrapped gas bubbles at the interface between the core and cladding materials.

A further object of the invention is to provide such method and apparatus which may be easily adapted for utilization with standard drawing techniques and apparatus.

It is a further object of the invention to provide such method and apparatus for cladding only desired sides of a polygonal cross-sectioned glass laser rod core.

A still further object of the invention is to provide such method and apparatus which may be performed efficiently and inexpensively.

Briefly, the invention in its broadest aspect comprises method and apparatus for cladding at least one side of a polygonal cross-sectioned, elongated glass laser rod core with a suitable glass cladding material. The technique comprises the forming of an elongated slab of a glass cladding material to conform to the side of the glass laser rod core. A first end of the slab is placed against a first end of a glass laser rod core side to form a line of contact therebetween across the side of the glass laser rod core. The opposite end of the slab is spaced by means of spacers from the opposite end of the glass laser rod core thereby forming a wedge-shaped space therebetween. The slab is then urged toward the side of the glass laser rod core. The slab and core are then progressively heated along the lengths thereof from the first ends to drawing temperatures in a drawing furnace. The slab and core are then drawn in to form a laser rod having the cladding material fused to at least one side thereof, the line of contact between the core and cladding progressing continually along the sides of the core as the core and cladding are drawn into the drawing furnace.

Further objects, advantages, and features of the invention will be apparent in the arrangement and construction of the constituent parts in detail, as set forth in the following specification taken together with the accompanying drawing.

DETAILED DESCRIPTION OF THE PREFERRED EMBODIMENTS

Figure 1:
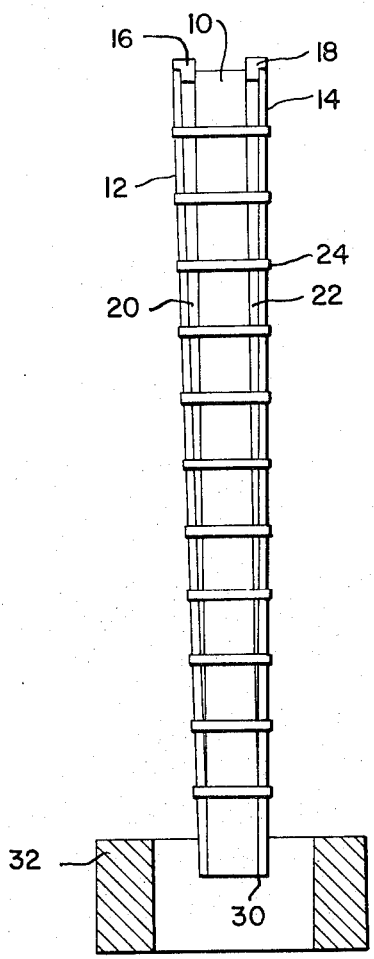
FIGS. 1 and 2 are generally schematic representations of alternative means of forming a cladding material onto a polygonal cross-sectioned glass laser rod core according to the present invention.

In referring to the various embodiments of the present invention hereinbelow, like reference numerals will be utilized to refer to identical parts.

Although the following description will be limited, in general, to the application of suitable cladding materials to laser rod cores having rectangular cross-sectional configurations since that is the presently preferred mode of operation, it should be understood that the method and apparatus to be described herein are equally useable and applicable to the cladding of any laser rod having a polygonal cross-sectional configuration.

Referring now to FIG. 1 of the drawing, there is shown an elongated glass laser rod core 10 which has a polygonal cross-sectional configuration. By polygonal cross-sectional configuration, it is meant herein that the glass laser rod core 10 is formed by a plurality of at least three circumferentially disposed and intersecting linear side faces, the relative size and angles of intersection therebetween being immaterial to the present invention. In the present figures, the rod is of generally rectangular cross-sectional configuration; however, it is to be understood that any number of sides may be utilized as desired by the designer. Furthermore, the cross-sectional configuration of the laser rod core may, in some cases, vary in relative size along the length of the rod, such as if the rod is tapered along its length. Such a taper may be used for the purposes of strengthening the rod at the output end, such as is shown in copending U.S. patent application, Ser. No. 833,949, filed June 17, 1969, by C. G. Young, and also assigned to the assignee of the present application. The core is formed of any suitable glass laser material, such as is described in copending U.S. patent application Ser. No. 168,012, filed Jan. 16, 1962, by Elias Snitzer and which is assigned to the assignee of the present application, and in U.S. Pat. No. 3,533,956 issued Oct. 13, 1970, again by Elias Snitzer. The subject matter thereof is incorporated herein by reference.

A pair of slabs 12 and 14 of a suitable glass cladding material are shown disposed adjacent the glass laser rod core 10. The slabs 12 and 14 are formed of a material as described hereinabove and are formed so as to conform to the particular side of the glass laser rod core to be clad. As was described hereinabove, a problem in the prior art has existed with respect to the entrapment of bubbles of gas between the core and cladding. In order to prevent such entrapment, the present invention places the slabs 12 and 14 against the core 10 only at one end thereof. This is shown by a line of contact 30 between the core 10 and the cladding 14. At the other end, spacers 16 and 18 are inserted between the slabs 12 and 14 respectively, and the core 10 at the corners thereof, to provide wedge-shaped spaces 20 and 22 between the slabs and the core such that gas may escape therefrom.

Figure 2:
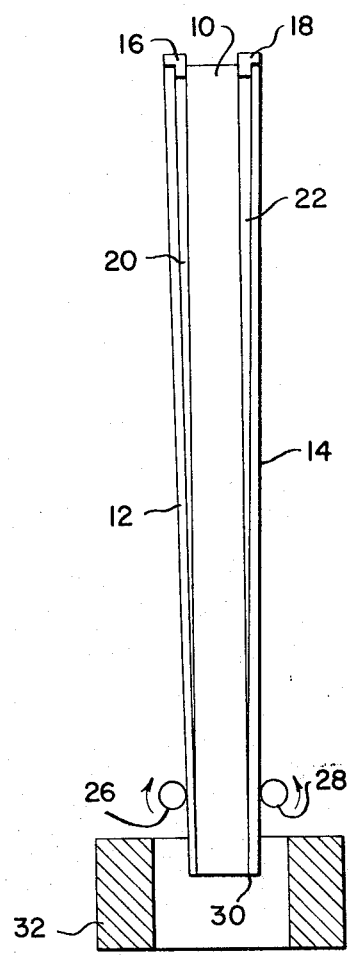

For reasons which will be explained more fully hereinbelow, it is necessary that a means be provided for urging the slabs 12 and 14 of cladding glass material toward the glass laser rod core 10. In FIG. 1, this means is provided by a series of bands of slightly elastic tape 24 which surround the core and cladding assembly and force the cladding toward the core. A second means for urging the slabs of cladding material toward the core is shown in FIG. 2 wherein a pair of rollers 26 and 28 are disposed such that the assembly of core and cladding glass slabs are forced therebetween prior to entry into the drawing furnace 32. The teaching of the aforementioned U.S. Pat. No. 3,037,241 to Bazinet and Cole, is incorporated herein to show a standard drawing furnace. The rollers are biased toward the core to provide the required urging force. Similarly, spring loaded fingers or a precisely sized collar could be used to provide the necessary urging force.

The procedure, according to the invention for the cladding of such a core, is initiated by the forming of an elongated slab of a suitable glass cladding material. In particular, care should be exercised in the selection of a cladding glass to chose one which closely matches the core glass in coefficient of thermal expansion and which is chemically compatible with the core glass. The slab of cladding glass material is placed against the glass laser rod core at one end thereof and is spaced from the core at the opposite end. This creates the aforementioned line of contact 30 between the slab and the core adjacent one end of the assembly. The slab is urged toward the side of the glass laser rod core so that as the glass of the slab softens in the drawing furnace, the slab in brought into progressive contact with the core. The slab and core are progressively heated along the length thereof commencing from the end where the initial line of contact occurs. The slab and core are then drawn by standard drawing techniques to form a fused laser rod having a cladding material thereon. The progressive heating and drawing operations are generally performed in a drawing furnace schematically indicated by reference numeral 32. In those instances, where the urging means is supplied by a mechanism such as spring fingers or rollers, it is preferred that it be accomplished by the application of a line of force substantially across the width of the slab adjacent and generally parallel to the line of contact between the sab and the side of the glass laser rod core.

While the foregoing description has been basically centered around the cladding of one or perhaps two sides of a generally rectangular configuration, obviously the technique may be easily extended to the application of a cladding material completely around the periphery of a glass laser rod core. Each slab of cladding glass is handled in the aforementioned manner. However, additional care must be taken to assure that proper matching of the slabs of cladding material will occur when the slabs are fused to the core. Improper fit can result in raised joints, i.e. entrapped gas, or thinning of the cladding at the corners.

The aforementioned technique for cladding glass laser rod cores may be modified somewhat by continuously wrapping a slightly elastic tape around substantially the entire length of the slab and core assembly such that a low grade vacuum may be drawn in the space between the core and the cladding material. This low grade vacuum is not sufficient nor is it intended to collapse the cladding against the core in the manner generally utilized in cladding circular cross-sectioned configurations. It is merely to assist in the evacuation of gas from between the core and the cladding. This technique is easily applicable to this configuration as the standard fiber optic drawing furnace has a fixture for mounting the elongated glass laser rod core in an extended position in alignment with the drawing furnace. This fixture generally has adapted directly therein, a means for drawing such a vacuum in a space between the core and cladding. It has been found that tapes formed of "Teflon" fluorocarbon have proven to be quite satisfactory in this utilization.

A specific example according to the present invention is given hereinbelow. A rectangular cross-sectioned elongated glass laser rod core was clad on each of the two major side faces only. Data relative to the composition of the core and cladding glasses is given in Table I, wherein the various constituents are set forth by weight percent.

TABLE I

|   | Core glass | Cladding glass |
| --- | --- | --- |
| $SiO_2$ | 67.1 | 66.40 |
| $Na_2O$ | 7.2 | 7.13 |
| $K_2O$ | 10.9 | 10.78 |
| $BaO$ | 4.8 | 4.75 |
| $Sb_2O_3$ | 1.0 | 0.99 |
| $Al_2O_3$ | 1.5 | 1.48 |
| $ZnO$ | 1.5 | 1.48 |
| $Nd_2O_3$ | 5.0 |  |
| $Li_2O$ | 1.0 | 0.99 |
| $Sm_2O_3$ |  | 6.00 |

Similarly, the dimensions of the core and each of the slabs of cladding glass are given in Table II.

TABLE II

|   | Core | Slabs |
| --- | --- | --- |
| Length, inches | 10.5 | 10.5 |
| Width, mm | 36 | 36 |
| Thickness, mm | 12 | 1 |

The cladding material slabs were placed in line contact with the core at one end and were spaced from the core at the other end by spacer tabs constructed from 0.020 inch thick steel sheet stock. The slabs were held in position against the core and urged toward the core by a series of bands of "Teflon" tape. The bands were spaced about one inch apart throughout the length of the assembly.

The assembly was fastened and aligned in the upper holding fixture of a standard drawing furnace. The furnace temperature was set at 1350° F. and the furnace set to perform a 4:1 reduction in area during the drawing operation. The assembly was then progressively fed into the furnace and the desired clad slab laser rod was formed. The bands were cut and removed from the assembly immediately prior to the entry of each section of the assembly into the furnace.

While there have been shown and described what are considered to be perferred embodiments of the present invention, it will be obvious to those skilled in the art that variods changes and modifications may be made therein without departing from the invention.

What is claimed is:

1. Apparatus for cladding at least one side of an elongated glass laser rod core having a polygonal cross-section with a slab of a suitable glass cladding material, the apparatus comprising
    a drawing furnace,
    a fixture for extendedly holding the elongated glass laser rod core in suitable alignment with the drawing furnace,
    means for spacing an end of the slab of a suitable glass cladding material away from the side of the elongated glass laser rod core, the spaced end of the slab being adjacent the fixture, the opposite end of the slab being in approximately line contact with and across the side of the elongated glass laser rod core, and
    means for urging the slab toward the side of the elongated glass laser rod core whereby when the core and slab are progressively heated and drawn in the drawing furnace, gases are forced to escape from between the core and slab as the line contact between the core and slab progressively moves along the length of the core and slab thereby forming a bubble-free interface in the clad laser rod.

2. Apparatus according to claim 1, wherein the means for spacing an end of the slab comprises a pair of spacers associated with the slab, the spacers being disposed between the slab and the side of the elongated glass laser rod core and at the edges thereof so that gases may escape therebetween.

3. Apparatus according to claim 1, wherein the means for urging the slab toward the side of the elongated glass laser rod core is continuously disposed over substantially the entire length of the slab.

4. Apparatus according to claim 3, wherein the means for continuously urging the slab toward the side of the elongated glass laser rod core is a slightly elastic tape which is wrapped around the slab and core so as to seal the space therebetween, and wherein means are provided for drawing a vacuum in the space to assist in the degassing thereof.

5. Apparatus according to claim 1, wherein the means for urging the slab toward the side of the elongated glass laser rod core comprises means for applying a line of force substantially across the slab adjacent and generally parallel to the line of contact between the slab and the side of the elongated glass laser rod core.

References Cited

UNITED STATES PATENTS

| 3,442,738 | 5/1969 | Scott et al. | 65—Dig. 7 |
| 3,224,851 | 12/1965 | Hicks, Jr. | 65—Dig. 7 |
| 2,992,516 | 7/1961 | Norton | 65—Dig. 7 |
| 3,615,313 | 10/1971 | Phaneuf | 65—4 |
| 3,395,006 | 7/1968 | Hopkins et al. | 65—157 |

FRANK W. MIGA, Primary Examiner

U.S. Cl. X.R.

65—155, 157